(12) United States Patent
Li

(10) Patent No.: US 6,385,007 B1
(45) Date of Patent: May 7, 2002

(54) HEAT DISSIPATION SYSTEM OF MAGNETIC RECORDING DISK

(75) Inventor: Robert Yuan-Shih Li, Fremont, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/652,227

(22) Filed: Aug. 29, 2000

(51) Int. Cl.[7] ................... G11B 33/14; G11B 17/00
(52) U.S. Cl. ............................. 360/97.02; 360/69
(58) Field of Search .................. 360/97.01–97.04, 360/69; 361/685, 695, 635, 687

(56) References Cited

U.S. PATENT DOCUMENTS

| 5,673,029 A | 9/1997 | Behl et al. ............ 340/635 |
| 5,793,608 A | 8/1998 | Winich et al. ......... 361/695 |
| 5,796,580 A | 8/1998 | Komatsu et al. ....... 361/687 |
| 5,870,297 A | 2/1999 | Dahler et al. ......... 363/95 |
| 5,886,639 A | 3/1999 | Behl et al. ............ 340/635 |
| 5,912,799 A | 6/1999 | Grouell et al. ........ 361/685 |
| 6,147,834 A | * 11/2000 | Srikrishna et al. ..... 360/97.02 |

FOREIGN PATENT DOCUMENTS

| GB | 2040538 | * 8/1980 | ............ 360/97.02 |
| JP | 58-105470 | * 6/1983 | ............ 360/97.02 |
| JP | 63-136384 | * 6/1988 | ............ 360/97.02 |
| JP | 3-237675 | * 10/1991 | ............ 360/97.02 |

* cited by examiner

Primary Examiner—Allen Cao
(74) Attorney, Agent, or Firm—Lumen Intellectual Property Services

(57) ABSTRACT

A system to control the interior temperature and particularly the slider and disk temperature of hard disk drives that utilizes the spindle motor to spin a fanning structure. The fanning structure is preferably integrated into the hard disk drive and initiates a cooling air stream that is directed within the contained interior of the hard disk drive toward a Peltier-element that drains the thermal energy into the surrounding environment. In an alternate embodiment, the fanning structure initiates an exterior air stream that provides a cooling air stream at the outside of the Peltier-element. The Peltier-element is controllable to decouple operational temperature variations from environmental temperature variations.

41 Claims, 9 Drawing Sheets

HEAT DISSIPATION SYSTEM OF MAGNETIC RECORDING DISK

FIELD OF INVENTION

The invention relates to the field of hard disk cooling. In particular, the invention relates to a cooling system utilizing fanning structure driven by the spindle motor.

BACKGROUND OF INVENTION

Magnetic recording disks (MRD's) are continuously improved to provide higher storage capacity, data transfer rates, and lower access times. The increase of the rotational speed of the hard disk(s) is one approach to improve the performance of the MRD's. Additionally, electronics that are more powerful are packaged inside the housing of the MRD to perform the necessary operational tasks related to the reading and writing of data on the hard disk(s).

The overall dimensions of MRD's are defined by a number of standardized classes. These standardized dimensions of the MRD housings force the development of increasingly compact designs. To meet the increasing performance demands, MRD's are manufactured with smaller functional features and higher precision. Especially the flying height of the slider over the surface of the hard disk is being continuously reduced. As a result, the internal area of MRD's becomes more sensitive to humidity and particularly to dust. To keep dust away, MRD housings are therefore typically sealed. Only a relatively small opening remains to adjust the internal air pressure to variations of the surrounding atmosphere without appreciable air exchange.

The performance increase of MRD's results in an increase of internally generated thermal energy. Sources of the thermal energy are the electronics, the spindle motor, the voice coil, the friction of the disk driven air and friction of the slider on the hard disk surface. With the surface area of the housing remaining constant, the increased thermal energy can only be dissipated by maintaining a higher temperature difference between the housing surface and the surrounding environment. Hence, for a given temperature of the surrounding environment, the housing temperature and consequently the internal temperature of the MRD are higher. Internal temperature rise of the MRD becomes an increasingly dominant limitation for the optimization of MRD's. In addition, it is desirable to keep the internal temperature as constant as possible to maintain thermally induced deformations of the high precision features of the disk within the ever tighter tolerances.

With smaller flying heights of the sliders over the disk surfaces, the air viscosity also becomes a more and more significant consideration. The slider's air bearing surfaces are designed to provide a constant flying height for a given air viscosity. Hence, changes in the air viscosity due to temperature differences result in changes of the flying heights. These flying height variations have to remain at a minimum. High thermal energy can destabilize the magnetic orientation of the bit wise stored data on the media. The thermal energy is usually represented by k times T where k is the Boltzman constant and T is the absolute temperature. This unfavorable destabilization occurs when the volume of the magnetic particles representing the bit decreases in disk designs with high data densities. An ability to reduce the thermal energy will enhance the magnetic stability of the bit wise stored data.

To limit the internal temperature rise a number of inventions are disclosed in the prior art. These inventions mainly improve the heat convection of the MRD housing by introducing and directing an air flow along a part or along the whole housing. For instance, U.S. Pat. Nos. 5,912,799, 5,886,639, 5,793,608, 5,796,580, and 5,673,029 describe such inventions. In all these inventions, the cooling is provided by a device, which is independent from the MRD. This type of cooling therefore cannot take into account specific cooling requirements that vary between individual MRD's. MRD manufacturers are not able to take such cooling systems into account in computing the maximum operational thermal energy output, since there does not exist a common standard among computer manufacturers for heat drain provided within the computer chassis.

To eliminate the limitations described in the paragraph above, U.S. Pat. No. 5,870,247 introduces a fan system integrated in a hard disk drive. Adjacent to the hard disk drive is attached an air channel structure including a miniaturized fan. The fan draws air from the surroundings and blows it through the channel structure. The channel structure is designed to draw thermal energy from the essentially sealed operational volume of the hard disk drive and to drain that thermal energy into the fan induced air stream. The structural combination of hard disk drive and fan cooling system allows to increase MRD performance parameters and raise the operational thermal energy. Unfortunately, this is accomplished at the expense of available operational volume of the hard disk drive.

General limitations of fan cooling systems are, for instance:

their propensity to accumulate dust deposits, which significantly reduces the convective properties of the cooling surfaces;

their efficiency dependence on the surrounding air temperature;

their voluminous space requirements; and their noisiness.

Therefore, there exists a need for a MRD cooling system that can be structurally integrated within the MRD housing without reducing the available operational volume; that is insensitive to dust, highly independent of the surrounding air temperature, and preferably noiseless. The present invention introduces such a system.

OBJECTS AND ADVANTAGES

It is a primary object of the present invention to provide an MRD cooling system that can be structurally integrated within the MRD housing without reducing the available operational volume.

It is another object of the present invention to provide an MRD cooling system that is insensitive to dust.

It is a further object of the present invention to provide an MRD cooling system that is highly independent of the surrounding air temperature and air condition like, for instance, humidity and air velocity.

Finally, it is an object of the present invention to provide a MRD cooling system that is essentially noiseless.

SUMMARY

The present invention utilizes a rotating fanning structure driven by the spindle motor to generate cooling air streams in a cooling system for a magnetic recording disk (MRD).

In the preferred embodiment of the invention, the rotating fanning structure is combined with the hard disk structure. The fanning structure induces a cooling air stream on the essentially closed air volume inside the MRD housing. The cooling air stream is directed towards a thermal bridging element that reaches through the MRD housing. The thermal bridging element drains the thermal energy received from the cooling air stream into the surrounding environment. The thermal bridging element has internal and external access areas. The internal access area corresponds in its shape and location to the internal cooling air stream. The external access area may be an air contact area to drain the thermal energy into the surrounding air. The external access area may also be a structural contact area to drain the thermal energy into a frame structure or other thermally conductive structures of the MRD mounting site.

The internal fanning structure is incorporated into the hard disk and operates according to the principles of a radial fan and/or an axial fan.

In an alternate embodiment, the rotating fanning structure operates outside the self-contained operational MRD volume. The external fanning structure utilizes air from the surrounding environment to create a cooling air stream along the thermal bridging element. The thermal bridging element is of a form and placed at a location that correspond to the internal thermal path of the MRD. Form and location of the thermal bridging element eventually correspond also to an external cooling air stream generated by an external rotating fanning structure. The eventual external fanning structure has a form that corresponds to the known working principles of a radial fan and/or an axial fan. The external fanning structure may be combined with the internal fanning structure.

The thermal bridging element may be a Peltier-element, which provides a controllable thermal bridge. The Peltier-element allows, on the one hand, to adjust the thermal drain from the MRD interior and thereby helps to reduce the operational temperature bandwidth inside the MRD. On the other hand, the Peltier-element allows to drain more thermal energy for a given temperature difference between the thermal bridging element and the surrounding environment. Consequently, the maximal temperature inside the MRD can be kept at a lower level and internal temperature variations remain low.

DETAILED DESCRIPTION

Magnetic recording devices (MRD) have one or more recording disks (RD) that spin during the operational use of the MRD at one or more rotational speeds. The spindle motor has to provide sufficient torque to accelerate the RD and keep the RD at the operational speed against the hampering influences. These hampering influences are mainly the bearing resistance in the spindle bearings, the air friction of the RD and the slider friction of the magnetic recording slider(s), which move in radial direction along the spinning disk surface(s). Other energy consuming operations take place inside the MRD like, for instance, the back and forth movement of the head gimbal assembly (HGA) and the control electronics of the MRD. The result of all these energy consuming operations is a thermal energy accumulation within the MRD.

Thermal energy resulting from the operating spindle motor, the air friction, and the slider friction are the main contributors to the thermal rise inside the MRD. Motor heat, slider friction heat and air friction heat increase faster than in proportion to increasing rotational speed of the RD.

Figure 8:
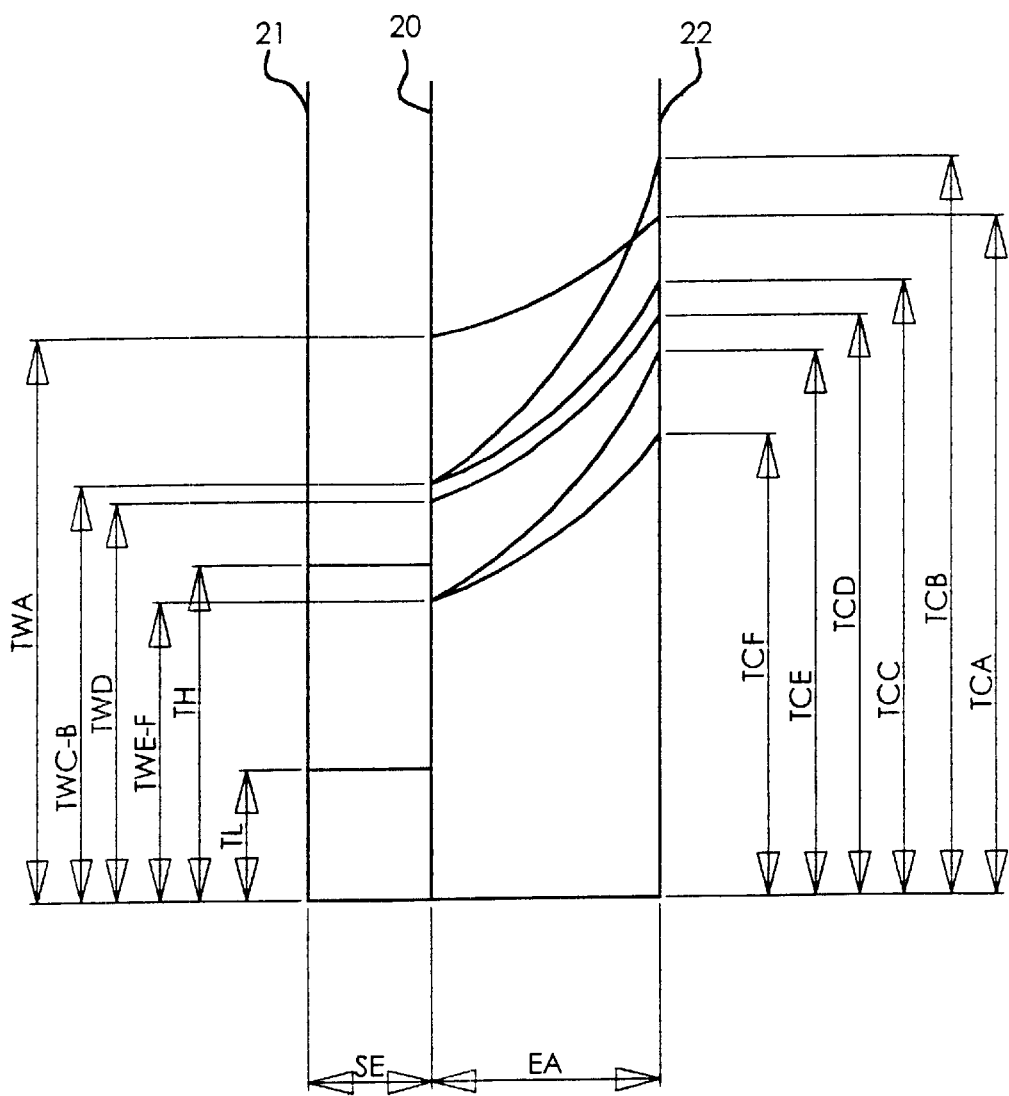
FIG. 8 shows a simplified exemplary graph of the temperature distributions for the exemplary combinations presented in the FIGS. 1A–F.

Inside an MRD there exist peak temperature locations 22 (see FIG. 8). Peak temperature locations 22 are, for instance, high performance electronic components, spindle motor and sliders. The thermal energy created at these peak temperature locations 22 is conductively transmitted via thermal paths to heat drain locations 20 (see FIG. 8), which are typically on the outside of the MRD housing. The thermal paths have thermal conductivity properties that define the resulting temperature difference between the heat drain locations and the peak temperature locations 22.

A peak temperature location 22 may have an interrupted thermal path. For instance, the slider friction heat is drained along a thermal path that runs: first, from the RD surface inwards along the shaft onto the housing via the shaft bearings; and second, from the slider along the slider arm onto the housing via the gimbal bearings. Bearings are known to be poor thermal conductors.

In the preferred embodiment of the present invention, a predetermined closed air stream is initiated and maintained by a spinning fanning structure mounted on the shaft of the spindle motor.

The closed air stream circulates within the self-contained volume of the MRD and passes thermal energy from the temperature source locations 22 to the heat drain location 20. The amount of air, its velocity, its primary temperature difference and its first primary transmission properties at the thermal source locations 22 define the thermal energy that is passed from the thermal source location 22 onto the air stream. The amount of air, its velocity, its secondary temperature difference and its secondary thermal transmission properties at the heat drain location 20 define the thermal energy that is passed from the air stream onto the heat drain location 20.

In the preferred embodiment the heat drain location 20 is a specifically shaped and positioned thermal bridging element 36, 76 (see FIGS. 3–8). The thermal bridging element 36, 76 provides a thermally conductive path between the receiver body 36a, 76a (see FIGS. 3–8) and the drain body 36b, 76b (see FIGS. 3–8). The receiver body 36a, 76a is placed inside the self-contained interior volume EA (see FIG. 8) of the MRD. The drain body 36b, 76b is placed at a peripheral location of the MRD such that it drains its thermal energy into the surrounding environment SE (see FIG. 8).

The thermal bridging element 36, 76 may be of shape and material suitable to perform the task of receiving, transmitting and passing on thermal energy as is well known to those skilled in the art. Further, the thermal bridging element 36, 76 may be a Peltier-element as is well known to those skilled in the art.

A fanning structure 38, 48 (see FIGS. 2–7) is driven by the spindle motor 31 (see FIGS. 2–7) within the interior volume EA and/or within the surrounding environment SE. Further, the MRD may be designed with a spindle motor 31 and/or other heat generating components being inside or outside the interior volume EA. The FIGS. 1A–F symbolize the thermal paths for these arrangements of the MRD.

Figure 1:
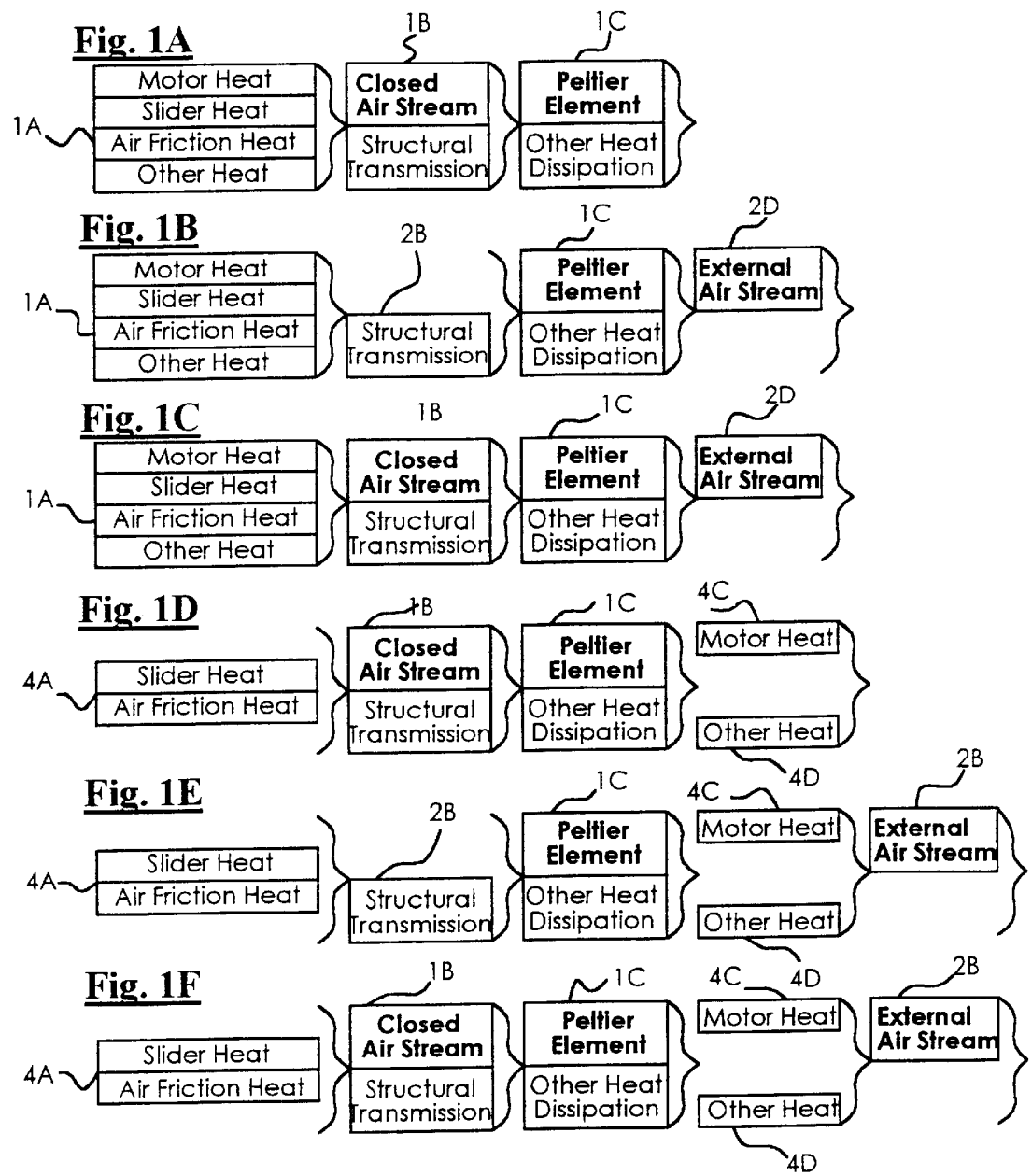
FIGS. 1A–F show block diagrams of the thermal path for exemplary combinations of thermal MRD designs, spindle motor induced air streams and the Peltier-element.

In FIG. 1A the motor heat, slider heat, air friction heat, and other heat are generated inside the interior volume EA as it is visualized in the block 1A.

The motor heat refers to the heat generated by the spindle motor; the slider heat refers to the heat generated by the slider rubbing on the disk surface respectively rubbing against a thin air film drawn by the spinning disk; the air friction heat refers to the heat generated by the thin air film; and other heat refers to the heat generated mainly by electronic components.

In the case visualized in the FIG. 1A all the heat shown in block 1A is transmitted via the closed air stream and structural transmission of the block 1B onto the Peltier-element and on the other heat dissipation of the block 1C. The closed air stream refers to the air stream initiated by the fanning structure 38; the structural transmission refers to thermally conductive transmission within the structures of the MRD. The Peltier-element refers to the thermal bridging element 36, 76 in the preferred form of a Peltier-element; the other heat dissipation refers to heat drain occurring by other functional MRD elements, like for instance the housing, which are in contact with the surrounding environment such that a thermal energy is transmitted.

Figure 2:
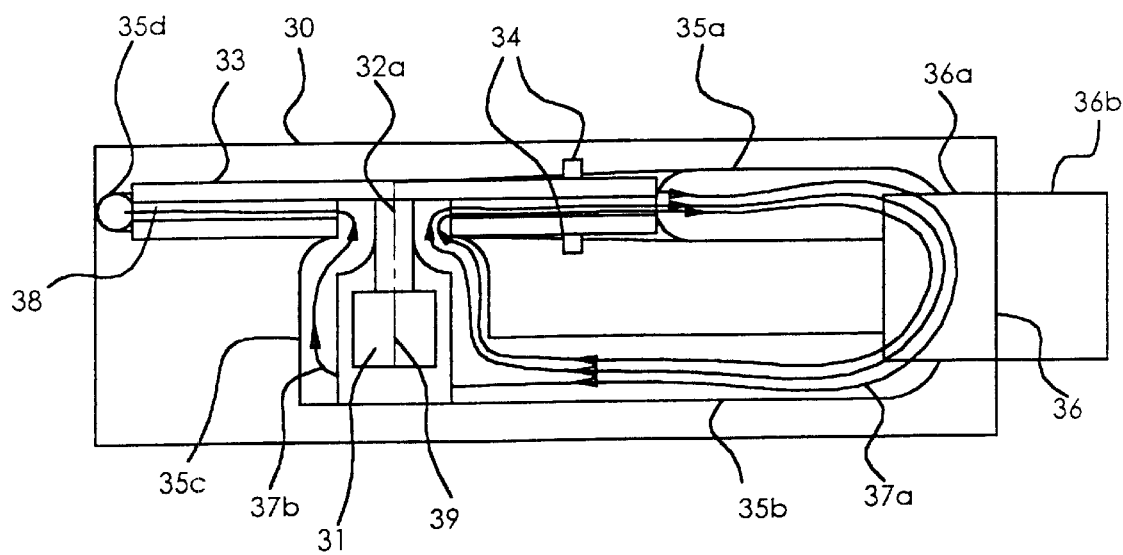
FIG. 2 shows a schematic section view of a MRD according to the combination of FIG. 1A.

FIG. 2 shows a schematic section view of a MRD of the present invention that corresponds to FIG. 1A.

Within a containment 30, e.g. a housing, the spindle motor 31 drives a hard disk 33, which spins on a spindle shaft 32a. The hard disk 33 has the integrated radial fanning structure 38, which may be manufactured with partly and/or completely closed fanning channels as is known to those skilled in the art. In the FIGS. 2, 4, 5 and 7, the integrated radial fanning structure 38 is completely closed, which corresponds to the functional use of the top and bottom surface of the hard disk 33. Top and bottom surface are accessed by the read/write heads 34. The integrated radial fanning structure 38 may be fabricated from a homogeneous material and/or from individually fabricated structures.

The fanning structures 38 are designed to provide a predetermined air stream for the flow properties of the closed air stream 37a, b. The closed air stream 37a, b flows within the channeling structure 35a–d. The channeling structure 35a–d may be provided by designated structural elements like, for instance, guides, channels, pipes, and/or tubes. The internal channeling structure 35a–d may also be formed by the conventional functional elements of an MRD as they are well known to those skilled in the art. These conventional functional elements may be designed with shapes and contours and they may be positioned with respect to each other inside the MRD such that guiding channels are formed. These guiding channels correspond with their size and their shape to the internal channeling structures 35a–d.

The closed air stream 37a–b receives the Slider Friction Heat and the Air Friction Heat while passing through the integrated radial fanning structure 38. The closed air stream 37a–b may receive thermal energies at other locations along the internal channeling structure 35a–d either directly from the heat generating sources or via intermediate thermal conductors.

The closed air stream 37a–b is guided along the receiver body 36a where it passes on its received thermal energy to the thermal bridging element 36. The thermal energy is conductively transmitted from the receiver body 36a to the drain body 36b where it is passed onto the surrounding environment.

In FIG. 1B the described thermal path corresponds to that described under FIG. 1A except that instead of the Closed Air Stream only the Structural Transmission, as shown with the block 2B is utilized to transmit the generated thermal energies from the source locations towards the Peltier-element respectively towards other features as referred under Other Heat Dissipation. Other features are, for instance the MRD housing, and/or contact areas of the MRD with mounting features of the MRD mounting site. In the block 2D, the External Air Stream refers to an open air stream 47a–b (see FIGS. 3, 4) initiated by the external radial fanning structure 48 (see FIGS. 3, 4).

The open air stream 47a–b derives its air from the surrounding environment SE and is directed along the external channeling structure 45a–b towards the drain body 36b, where it enhances the transmission efficiency between drain body and surrounding environment as is well known to those skilled in the art. The external radial fanning structure 48 may be placed at the start or the end of the traveling path of the open air stream 47a–b inside the external channeling structure 45a–b such that the open air stream 47a–b may be sucked or pushed through the external channeling structure 45a–b.

Figure 3:
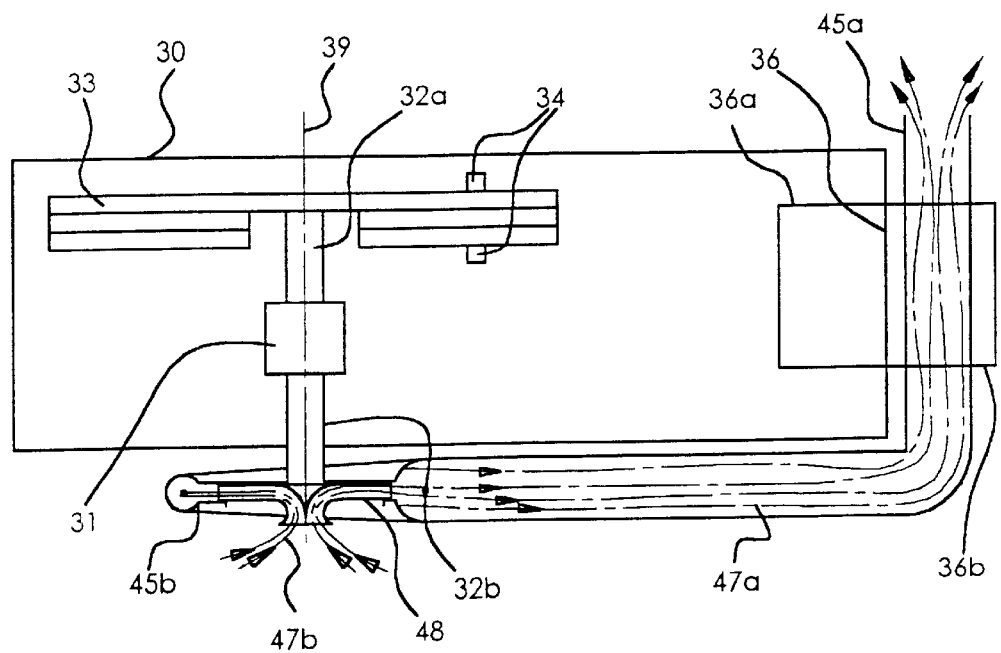
FIG. 3 shows a schematic section view of a MRD according to the combination of FIG. 1B.

FIG. 3 visualizes a section view of a simplified MRD that operates according to the explanations stated under FIG. 1B. The spindle motor 31 drives along with the hard disk 33 and with a secondary shaft extension 32b the external radial fanning structure 48. The external channeling structure 45a–b may be provided by designated functional elements like, for instance, guides, channels, pipes, and/or tubes. The external channeling structure 45a–b may also be formed together with functional features of the MRD like for instance the housing and functional features of the mounting site. Since mounting sites for MRD have standardized dimensions, the MRD may be designed to form together with features of these mounting sites open and/or closed channel structures that correspond in shape and dimension to the external channeling structure 45a–b.

Figure 4:
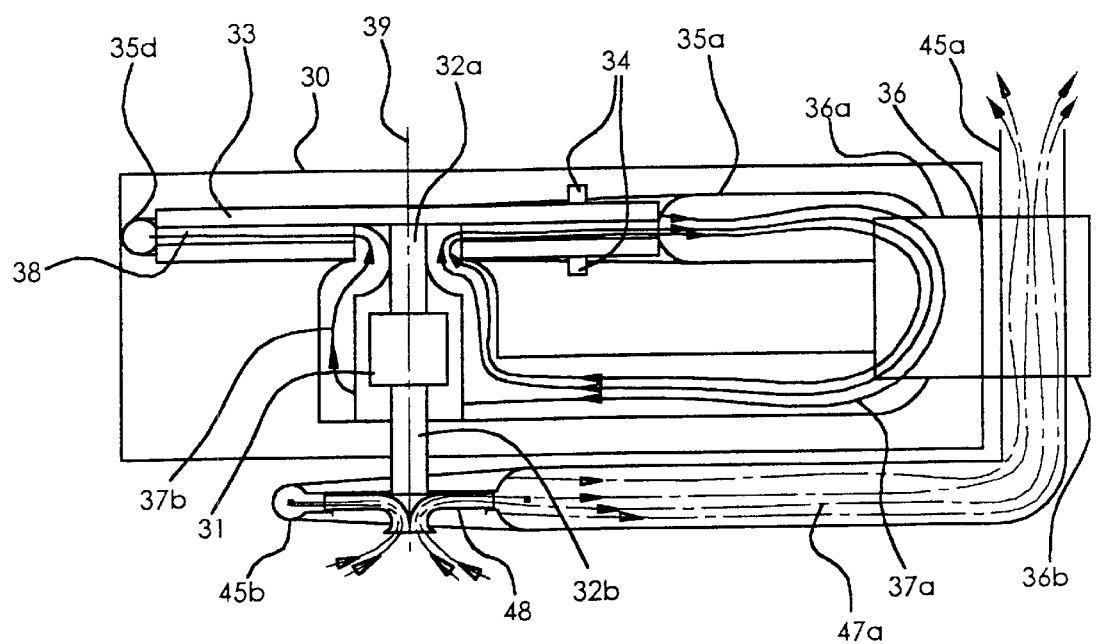
FIG. 4 shows a schematic section view of a MRD according to the combination of FIG. 1C.

FIG. 1C and the corresponding FIG. 4 describe and visualize the combination of the integrated radial fanning structure 38 and external radial fanning structure 48 as described under FIGS. 1A, 1B respective to FIGS. 2, 3. The combination of integrated and external radial fanning structures 38, 48 provides the best transfer efficiency from the peak temperature locations 22 to the surrounding environment SE. As a result, the maximum temperature difference between the peak temperature location 20 and the surrounding environment SE is kept to a minimum.

The efficiency increase due to the combined utilization of internally and externally induced air stream is accomplished at the expense of additional spindle motor power, which results again in an increase of internally generated thermal energy. To circumvent this detrimental side effect, the spindle motor may be kept outside the containment 30. In addition, other heat generating functional elements like, for instance, the electronic components that are less sensitive to dust and humidity of the surrounding environment may also be kept outside the containment 30.

Inconsistencies are, for instance, dust, temperature variations, increased humidity. The hard disk and the data reading/writing unit of a MRD are specifically sensitive to these inconsistencies and are therefore preferably encapsulated within the self-contained volume EA.

Figure 5:
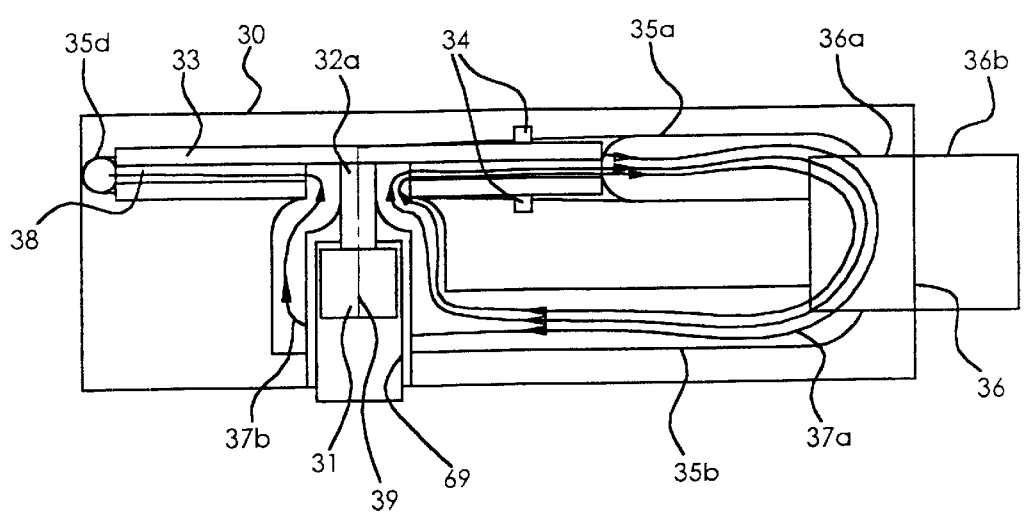
FIG. 5 shows a schematic section view of a MRD according to the combination of FIG. 1D.
Figure 6:
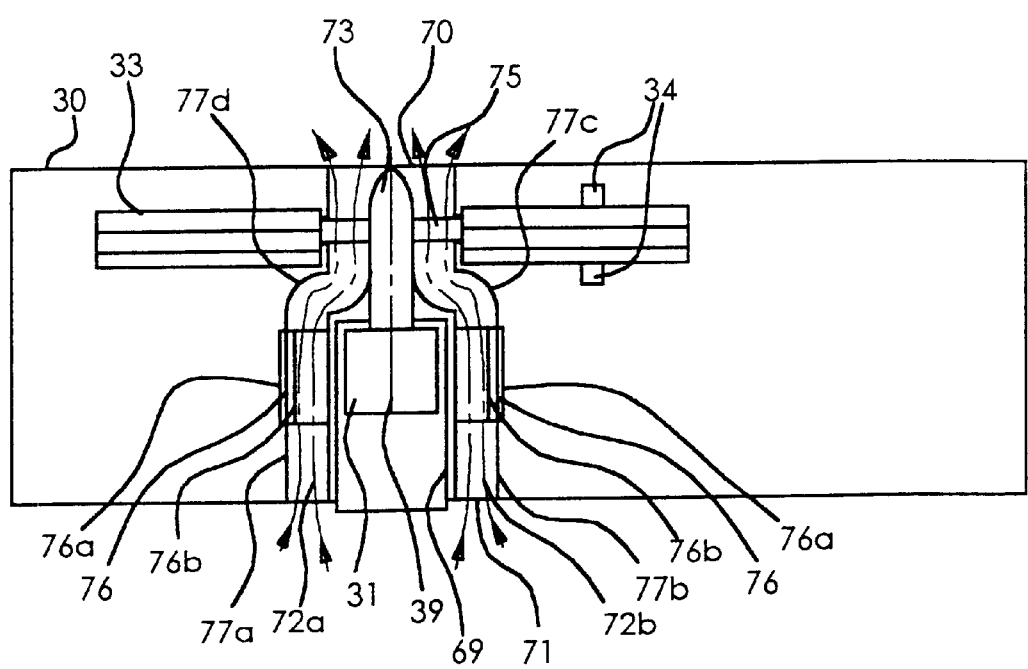
FIG. 6 shows a schematic section view of a MRD according to the combination of FIG. 1E.
Figure 7:
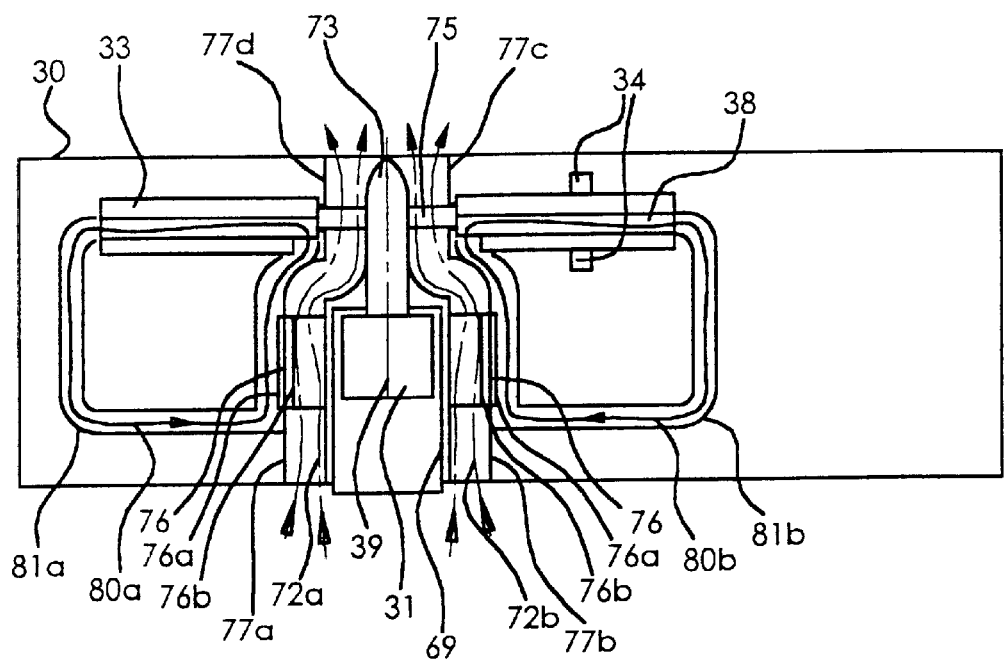
FIG. 7 shows a schematic section view of a MRD according to the combination of FIG. 1F.

FIGS. 1D, 1E, 1F and the correlated FIGS. 5, 6, 7 refer to the case with exterior spindle motor and other heat generating components. In this case the spindle motor is outside the self-contained volume EA.

In FIGS. 1D, 1E, 1F the block 4A shows the Slider Heat and the Air Friction Heat, which reference the internally generated heat as described under FIG. 1A. The blocks 4C and 4D show the Motor Heat and the Other Heat at a location of the block diagram that represents a location of the spindle motor and the other heat generating components outside the self-contained volume EA. The Motor Heat and the Other Heat correspond to those described under FIG. 1A.

FIG. 5 corresponds to FIG. 2 except that the spindle motor 31 reaches into the surrounding environment SE via separating feature 69. The separating feature 69 may be any structural element known to those skilled in the art to provide an air exchange of the spindle motor 31 with the surrounding environment SE and/or prevents heat transfer from the spindle motor 31 onto the self-contained volume EA.

FIG. 6 shows the simplified section view of an MRD with an externally located spindle motor 31 driving the hard disk 33 with an integrated axial fanning structure 75. In the example of FIG. 6, the external axial channeling structure 77a–d is arranged together with the thermal bridging element 76 concentrically around the rotation axis of the hard disk 31. This concentric arrangement allows volume efficient integration of air channel structures within the MRD. Further, the concentric arrangement provides rotationally symmetric cooling conditions, which assist in maintaining low thermally induced deformations. The thermal bridging element 76 has its drain body 76b in contact with the open axial air stream 72a–b and its receive body 76a in contact with the self-contained volume EA.

The external axial channeling structure 77a–d has the inlet opening 71 and an the outlet opening 70, which may be correspondingly shaped such that a number of MRDs' mounted along the direction of the spindle axis 39 may form a continuous channeling structure.

FIG. 7 is a schematic section view of an MRD with the internal concentric air stream 80a–b and the open axial air stream 72a–b. In the example of FIG. 7, the internal concentric air stream 80a–b is initiated by the internal radial fanning structure 38 and guided by the internal concentric channeling structure 81a–b.

It is noted that the internal air stream may also be initiated by an axial fanning structure. Internal and external channeling structures may be open and/or closed along the path of the internal/external air stream. Further, internal air streams may be a quasi open air stream with an inlet and an outlet within the self-contained volume such that the internal air stream is directed only along designated key locations like, for instance, the heat drain location 20 and/or the peak temperature locations 22.

FIG. 8 shows an exemplary graph with temperature differences for the cases described in FIGS. 1A–F and the corresponding FIGS. 2–7. The surrounding environment SE has a minimal temperature TL and a maximum temperature TH. For the purpose of simplicity, all other temperatures shown in FIG. 8 are related to the minimal temperature TL. In addition, the thermal bridging element 36, 76 is considered operating with a constant transmission characteristic. Also, temperatures at the heat drain locations 20 and at the peak temperature locations 22 are averaged to a single value per case. It is noted that these temperatures may vary within a single MRD and the simplifications undertaken in FIG. 8 are applied for the sole purpose of general understanding without any claim of proportional or absolute accuracy.

Corresponding to FIG. 1A and FIG. 2 the first bridge temperature TWA is defined by the first thermal energy according to the block 1A and first drain characteristic between the thermal bridging element 36 and the surrounding environment SE. The missing external air stream results in a relatively high temperature difference between TL and TWA. The internal air stream on the other hand provides for a relatively good transmission of the thermal energy from the peak temperature locations 22 to the heat drain location 20. As a result, the temperature difference between TWA and the first center temperature TCA is relatively small.

Corresponding to FIG. 1B and FIG. 3 the second bridge temperature TWB is defined by the first thermal energy according to the block 1A and second drain characteristic between the thermal bridging element 36 and the surrounding environment SE. The present external air stream results in a relatively small temperature difference between TL and TWB. The missing internal air stream on the other hand results in a relatively poor transmission of the thermal energy from the peak temperature locations 22 to the heat drain location 20. As a result, the temperature difference between TWB and the second center temperature TCB is relatively high.

Corresponding to FIG. 1C and FIG. 4 the third bridge temperature TWC is defined like TWB by the first thermal energy according to the block 1A and second drain characteristic between the thermal bridging element 36 and the surrounding environment SE. The present external air stream results in a relatively small temperature difference between TL and TWC. In addition, the present internal air stream results in a relatively good transmission of the thermal energy from the peak temperature locations 22 to the heat drain location 20. As a result, the temperature difference between TWC and the third center temperature TCC is relatively low. Eventhough the additional energy consumption of the spindle motor 31 results in an increase of the thermal energy that needs to be drained to the surrounding environment, the overall temperature difference between TL and TCC is still the lowest due to the more than proportional enhancement of the transmission characteristics along the thermal path.

Corresponding to FIG. 1D and FIG. 5 the fourth bridge temperature TWD is defined by the second thermal energy according to the block 4A and first drain characteristic between the thermal bridging element 36 and the surrounding environment SE. The missing external air stream results in a relatively high temperature difference between TL and TWD. The internal air stream on the other hand provides for a relatively good transmission of the thermal energy from the peak temperature locations 22 to the heat drain location 20. As a result, the temperature difference between TWA and the fourth center temperature TCD is relatively small. TWD and consequently TCD are significantly lower than TWA respectively TCA since only thermal energy referenced by Slider Heat and Air Friction Heat have to be drained.

Corresponding to FIG. 1E and FIG. 6 the fifth bridge temperature TWE is defined by the second thermal energy according to the block 4A and the second drain characteristic between the thermal bridging element 36 and the surrounding environment SE. The present external air stream results in a relatively small temperature difference between TL and TWE. The missing internal air stream on the other hand results in a relatively poor transmission of the thermal energy from the peak temperature locations 22 to the heat drain location 20. As a result, the temperature difference between TWE and the fifth center temperature TCE is relatively high. TWE and consequently TCE are significantly lower than TWB respectively TCB since only thermal energy referenced by Slider Heat and Air Friction Heat have to be drained.

Corresponding to FIG. 1F and FIG. 7 the sixth bridge temperature TWF is defined like TWE by the first thermal energy according to the block 4A and the second drain characteristic between the thermal bridging element 36 and the surrounding environment SE. The present external air stream results in a relatively small temperature difference between TL and TWF. In addition, the present internal air stream results in a relatively good transmission of the thermal energy from the peak temperature locations 22 to the heat drain location 20. As a result, the temperature difference between TWF and the sixth center temperature TCF is relatively low. TWF and consequently TCF are significantly lower than TWC respectively TCC since only thermal energy referenced by Slider Heat and Air Friction Heat have to be drained.

Figure 9:
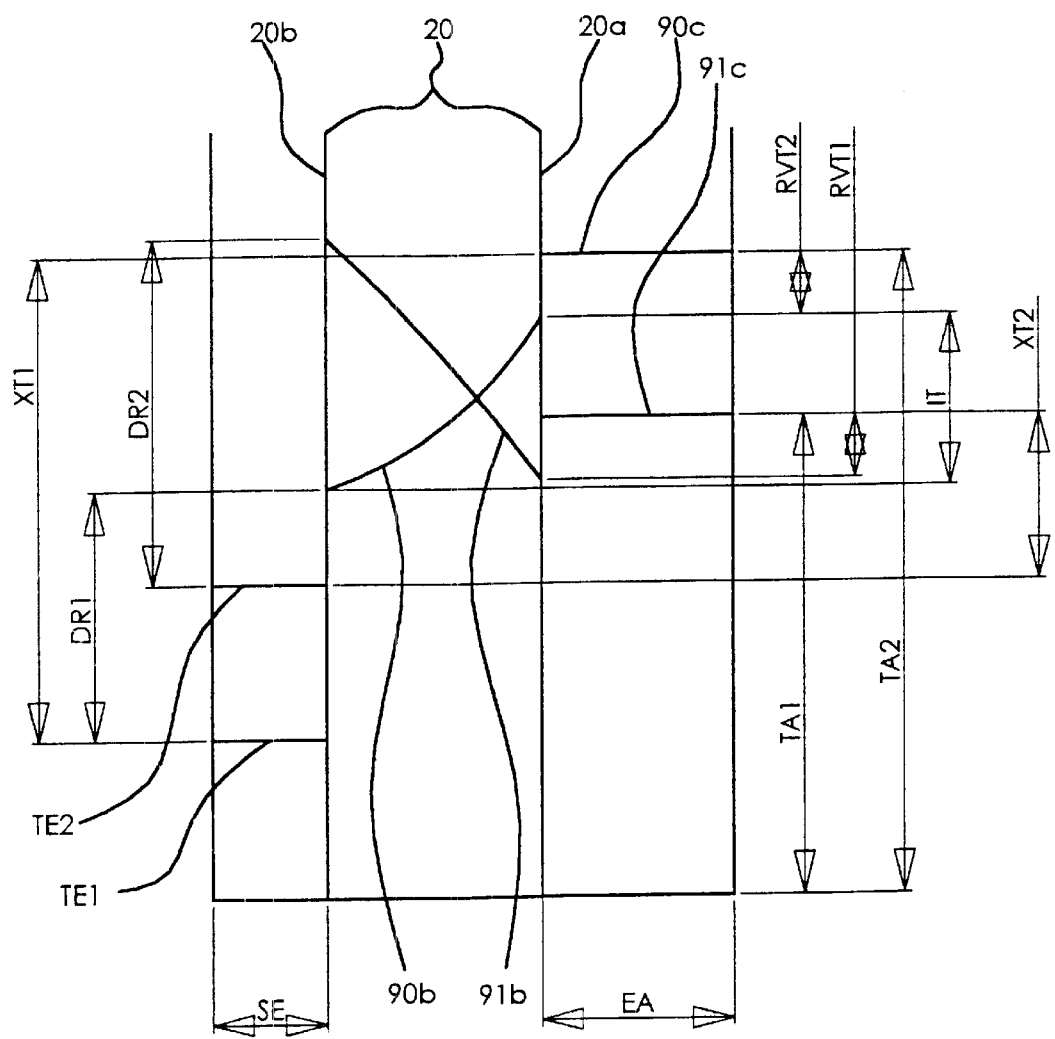
FIG. 9 shows an exemplary graph of temperatures within and around the thermal bridging element.

The use of a Peltier-element for the thermal bridging element 36, 76 allows compensating for the temperature variations in the surrounding environment SE. FIG. 9 shows in that respect a comparative graph of two MRDs' that differ only in the thermal bridging element 36, 76. FIG. 9 is an excerpt of FIG. 8. FIG. 9 shows more detailed the temperatures around and inside the heat drain location 20.

It is noted that all temperatures referred to in FIG. 9 are cited for the sole purpose of general understanding without any claim of proportional or absolute accuracy.

At the drain side 20b, the first or second thermal energy may be drained into the surrounding environment SE. In case, the heat drain location 20 is represented by a thermal bridging element 36, 76 that is passive, a first drain temperature difference DR1 between the drain side 20b and the surrounding environment SE occurs in correspondence to the drain of the first or second thermal energy. DR1 for the first environment temperature TE1 results in the temperature curve 90b. Since the bridging element 36, 76 at the drain location 20 is passive, 90b inclines towards the receive side 20a with the incline temperature IT. Even though IT can be kept low by following the known principles of designing passive heat exchangers, the temperature at the receive side 20a is always above the temperature at the drain side 20b.

To receive the first or second thermal energy at the receive side 20a, a receiving temperature difference RVTI is necessary between the internal transmitter and the receive side 20a, which results in the transmitter temperature TA1 at the receive side 20a. The internal transmitter may be the internal air stream and/or structural transmitter as described above.

Providing the thermal bridging element 36, 76 in the form of an active Peltier-element, the temperature at the drain side 20b can be kept higher than the temperature at the receive side 20a. This results in the declining temperature curve 91b. Since RVT for a constant transmitted thermal energy and constant transmission characteristics is proportional the Kelvin temperature difference of the receive side 20a relative the transmitter temperature TA2 for a Peltier-element is reduced correspondingly.

To provide an active temperature separation between the receive side 20a and the drain side 20b, the Peltier-element internally consumes energy. This internally consumed energy is also drained in the form of additional thermal energy at the drain side 20b. As a result, the second drain temperature difference DR2 is larger in proportion to the Kelvin temperature of the drain side 20b than the first drain temperature difference DR1 for otherwise constant transmission properties. Nevertheless, the use of the Peltier-element reduces the overall temperature difference XT1 to XT2 between TA2 and the second environment temperature TE2.

The Peltier-element is preferably utilized to keep TA2 with respect to the center temperatures TCA-F constant. This is achieved by using a control element that recognizes temperature variations of the surrounding environment SE between TL and TH (see FIG. 8) and correspondingly activates the Peltier-element.

It is noted that the Peltier-element may also be activated in an inverted fashion such that it provides a heating of the interior. This inverted activation of the peltier-element is preferably applied, when the ambient temperature decreases and the disk coercivity increases to the extent that the heads may not be able to write the data properly onto the media. As a result errors may occur and/or data may be lost. With both conventionally and inverted working peltier-element the MRD may be operated within an even larger temperature bandwidth of the surrounding environment.

The control element may also derive interior parameters like, for instance, interior temperature, interior temperature rise and interior temperature raising rate of the self-contained volume EA. Further, the control element may derive performance parameters about the performance level of the MRD. Information about the performance level is of particular interest when an MRD performs at various rotational speeds of the hard disk(s). is of particular interest when an MRD performs at various rotational speeds of the hard disk(s).

It is noted that the present invention as described for MDRs' may also by applied to other direct access storing devices that provide an essentially self-contained volume to read and/or write data from data storage disk. The particular advantage of combining the spinning of the data storage disk with the spinning of the fanning structure establishes a stable cooling method that increases its efficiency correspondingly to the increase of thermal energy within the direct access storage device. Correspondingly, the fanning structures may also be incorporated into removable disk like for instance CD-rom, DVD and the like.

Since the fanning structures are integrated in the housing, the noise they produce is muffled to a large extent. In addition, the efficient design of the cooling system allows keeping the fanning structures relatively small, which additionally contributes to a low operational noise level.

The self-contained volume EA may be partially or completely filled with air or any other fluid with pressures equal and/or different from that of the surrounding environment Accordingly, the scope of the invention described in the above specification is set forth by the following claims and their legal equivalent:

What is claimed is:

1. A system for cooling a direct access storage device having a spindle motor driving a data carrying disk, said data carrying disk being operated inside an essentially self-contained interior volume, said system comprising:
   a) a fanning structure being driven by said spindle motor, said fanning structure initiating a fluid stream;
   b) a thermal bridging element to bridge a thermal energy between said interior volume and a surrounding environment; and
   c) a channeling structure to channel said fluid stream along said thermal bridging element for exchanging said thermal energy.

2. The system of claim 1, wherein said thermal bridging element is a Peltier-element.

3. The system of claim 2, further comprising a Peltier-element control means.

4. The system of claim 3, wherein said Peltier-element control means derives an environment parameter to control said Peltier-element.

5. The system of claim 3, wherein said Peltier-element control means derives a performance parameter of said direct access storage device to control said Peltier-element.

6. The system of claim 3, wherein said Peltier-element control means derives an interior parameter of said direct access storage device to control said Peltier-element.

7. The system of claim 1, wherein said fanning structure is a radial fan.

8. The system of claim 1, wherein said fanning structure is an axial fan.

9. The system of claim 1, wherein said channeling structure channels said fluid stream in an essentially closed loop.

10. The system of claim 1, wherein said channeling structure channels said fluid stream in an essentially open loop.

11. The system of claim 1, wherein said channeling structure channels said fluid stream inside said interior volume.

12. The system of claim 1, wherein said channeling structure channels said fluid stream outside said interior volume.

13. The system of claim 1, wherein said fanning structure derives a filling fluid to initiate said fluid stream, said filling fluid filling said interior volume.

14. The system of claim 1, wherein said fanning structure derives an environmental fluid to initiate said fluid stream, said environmental fluid filling said surrounding environment.

15. The system of claim 1, wherein said fanning structure is integrated in said data carrying disk.

16. The system of claim 1, wherein said data carrying disk is a removable disk.

17. The system of claim 16, wherein said removable disk comprises said fanning structure.

18. The system of claim 1, wherein said channeling structure has an inlet geometry being symmetric with an outlet geometry along and relative to an array axis, said array axis defining an array direction of a number of said direct access storing devices.

19. The system of claim 1, wherein said channeling structure is provided by functional components of the direct access storage device.

20. A method for cooling a direct access storage device having a spindle motor driving a data carrying disk, said method comprising the steps of:

a) spinning a fanning structure with said spindle motor;

b) initiating a fluid stream with said fanning structure;

c) channeling said fluid stream along a thermal site; and d) transmitting a thermal energy from said thermal site onto said fluid stream.

21. The method of claim 20, wherein said fluid stream is channeled in an essentially closed loop.

22. The method of claim 20, wherein said fluid stream is channeled in an essentially open loop.

23. The method of claim 20, wherein said fluid stream is initiated from a filling fluid filling an interior volume of said direct access storage device.

24. The method of claim 20, wherein said fluid stream is initiated from an environment fluid filling a surrounding environment of said direct access storage device.

25. The method of claim 20, wherein said thermal site is a thermal bridging element.

26. The method of claim 25, wherein said thermal bridging element is a Peltier-element.

27. The method of claim 26, wherein said Peltier-element is controlled by a control means.

28. The method of claim 27, wherein said control means derives an environment parameter to control said Peltier-element.

29. The method of claim 27, wherein said control means derives a performance parameter of said direct access storage device to control said Peltier-element.

30. The method of claim 27, wherein said control means derives a interior parameter of said direct access storage device to control said Peltier-element.

31. A method for cooling a direct access storage device having a spindle motor driving a data carrying disk, said method comprising the steps of:

a) spinning a fanning structure with said spindle motor;

b) initiating a fluid stream with said fanning structure;

c) channeling said fluid stream along a thermal site; and d) transmitting a thermal energy from said fluid stream onto said thermal site.

32. The method of claim 31, wherein said fluid stream is channeled in an essentially closed loop.

33. The method of claim 31, wherein said fluid stream is channeled in an essentially open loop.

34. The method of claim 31, wherein said fluid stream is initiated from a filling fluid filling an interior volume of said direct access storage device.

35. The method of claim 31, wherein said fluid stream is initiated from an environment fluid filling a surrounding environment of said direct access storage device.

36. The method of claim 31, wherein said thermal site is a thermal bridging element.

37. The method of claim 36, wherein said thermal bridging element is a Peltier-element.

38. The method of claim 37, wherein said Peltier-element is controlled by a control means.

39. The method of claim 38, wherein said control means derives an environment parameter to control said Peltier-element.

40. The method of claim 38, wherein said control means derives a performance parameter of said direct access storage device to control said Peltier-element.

41. The method of claim 38, wherein said control means derives a interior parameter of said direct access storage device to control said Peltier-element.

* * * * *